United States Patent
Little et al.

(10) Patent No.: US 7,013,722 B2
(45) Date of Patent: Mar. 21, 2006

(54) SYSTEM AND METHOD FOR DETERMINING AIR PRESSURE

(75) Inventors: Baird M. Little, Nashua, NH (US); Kenneth David Harris, Jr., Nashua, NH (US); Joseph Geringer, Merrimack, NH (US); Charles J. Burout, III, Bedford, NH (US); Steven Schwartz, Bedford, NH (US)

(73) Assignee: Brookstone Purchasing, Inc., Merrimack, NH (US)

( * ) Notice: Subject to any disclaimer, the term of this patent is extended or adjusted under 35 U.S.C. 154(b) by 4 days.

(21) Appl. No.: 10/706,896

(22) Filed: Nov. 13, 2003

(65) Prior Publication Data

US 2005/0103108 A1    May 19, 2005

(51) Int. Cl.
*B60C 23/02* (2006.01)
(52) U.S. Cl. ..................................... 73/146.8
(58) Field of Classification Search .............. 73/146, 73/146.2, 146.3, 146.4, 146.5, 146.8
See application file for complete search history.

(56) References Cited

U.S. PATENT DOCUMENTS

| | | | |
|---|---|---|---|
| 4,333,491 A | 6/1982 | Knubley | 137/116.3 |
| 4,384,543 A | 5/1983 | Wong | 116/34 R |
| 4,748,845 A | 6/1988 | Rocco et al. | 73/146.8 |
| 4,924,697 A | 5/1990 | Hunt et al. | 73/146.8 |
| 4,998,438 A | 3/1991 | Martin | 73/146.8 |
| 5,168,751 A | 12/1992 | Hwang | 73/146.8 |
| 5,394,343 A | 2/1995 | Tsao | 364/558 |
| 5,556,489 A | 9/1996 | Curlett et al. | 152/418 |
| 5,606,123 A | 2/1997 | Rabizadeh | 73/146.8 |
| 5,628,350 A | 5/1997 | Gibb | 141/38 |
| 5,857,481 A | 1/1999 | Zimmerman et al. | 137/227 |
| 5,875,413 A | 2/1999 | Vinci | 702/91 |
| 5,891,277 A | 4/1999 | Bachhuber | 152/415 |
| 6,476,712 B1 * | 11/2002 | Achterholt | 340/447 |
| 6,516,659 B1 | 2/2003 | Chen | 73/146 |
| 6,553,934 B1 * | 4/2003 | Gentner et al. | 119/14.02 |
| 6,836,751 B1 * | 12/2004 | Paxton et al. | 702/186 |
| 2003/0024463 A1 | 2/2003 | Evans et al. | 116/34 R |

* cited by examiner

*Primary Examiner*—Max Noori
(74) *Attorney, Agent, or Firm*—Nixon Peabody LLP; Tim L. Brackett, Jr.; Andrea L. Hirst

(57) ABSTRACT

A pressure gauge for determining air pressure of an inflatable item and a method of doing the same are provided. Embodiments of the present invention provide a source of light capable of providing more than one color of light, where each color of light within the more than one color of light corresponds to a numerical relationship between a determined pressure of an inflatable item, determined by the pressure gauge, and a target air pressure. The pressure gauge also has a display panel for displaying the determined air pressure and at least one of the provided colors of light. In addition, the pressure gauge has a pressure sensor for determining the determined air pressure and a computer defining functions performed by the pressure gauge, wherein the computer causes the source of light to display the different colors of light in accordance with the numerical relationship between the determined air pressure and the target air pressure.

26 Claims, 4 Drawing Sheets

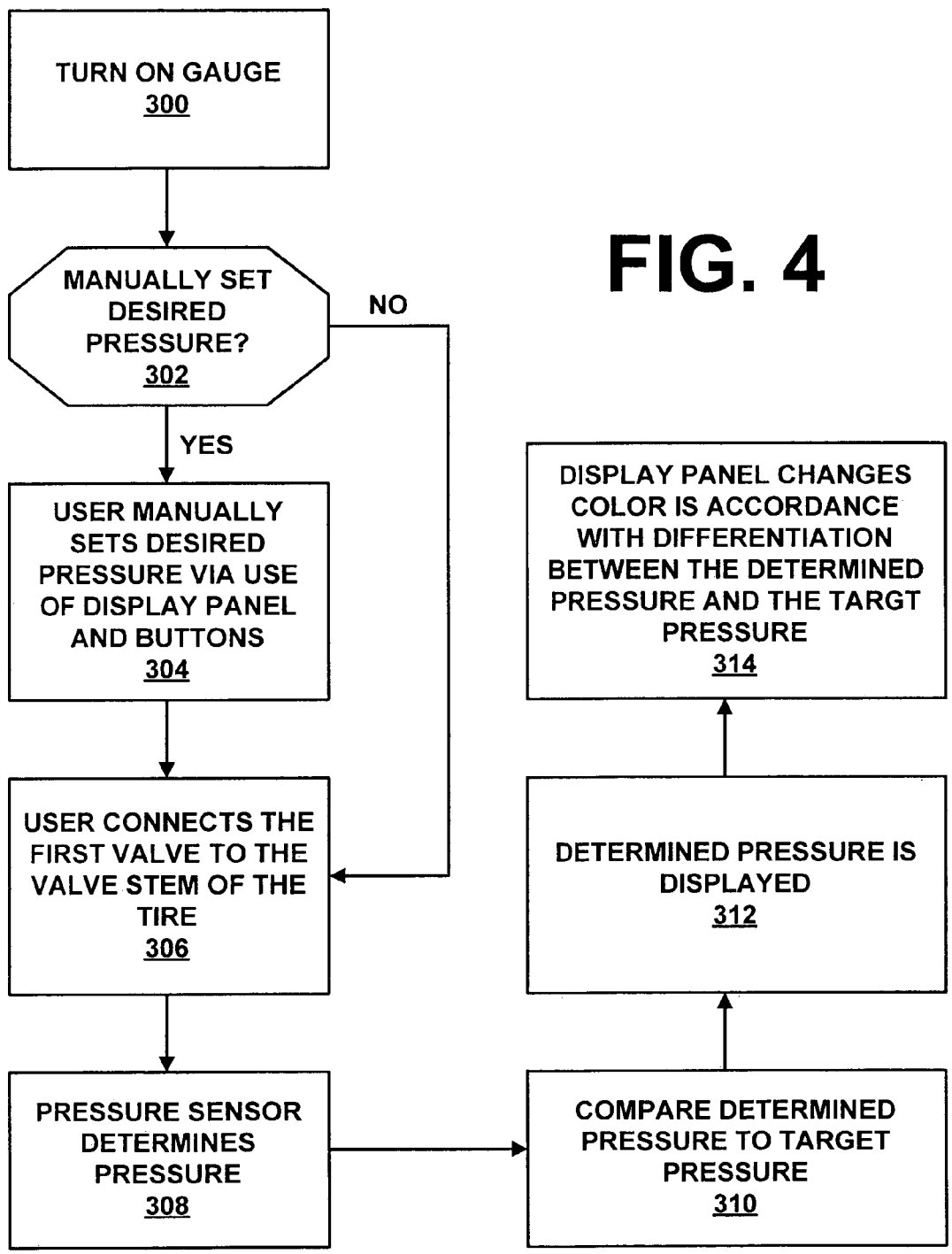

US 7,013,722 B2

SYSTEM AND METHOD FOR DETERMINING AIR PRESSURE

FIELD OF THE INVENTION

The present invention relates generally to an air pressure gauge, and more particularly, to a programmable air pressure gauge for determining and displaying air pressure in an inflatable item.

BACKGROUND OF THE INVENTION

With advancements in technology, pressure gauges have progressed in features and complexity. What was once a mechanical gauge, now may contain electronic circuitry and a digital display. One specific type of pressure gauge that has progressed technologically is the tire pressure gauge. Various tire pressure gauges are known in the art. For example, U.S. Pat. No. 4,748,845, to Rocco, et al., discloses a tire pressure gauge that emits an audible signal indicating that a tire pressure display should be read. Specifically, the audible signal indicates that a tire pressure reading is stable.

Other pressure gauges are capable of digitally displaying both an actual tire pressure and deviation of the actual tire pressure from a preset pressure reading. These readings are used by a user of a tire pressure gauge in an attempt to prevent over inflation of inflatable items. Unfortunately, many of the digital displays are difficult to read causing users to over inflat inflatable items.

While numerous technologies and features are made available by current tire pressure gauges, other user-friendly features are desirable. Thus, a heretofore unaddressed need exists in the industry to address the aforementioned deficiencies and inadequacies.

SUMMARY OF THE INVENTION

Embodiments of the present invention provide an apparatus for determining air pressure of an inflatable item. Briefly described, in architecture, one embodiment of the apparatus, among others, can be implemented as follows. The apparatus contains a source of light capable of providing more than one color of light, where each color of light within the more than one color of light corresponds to a numerical relationship between a determined air pressure of an inflatable item, determined by the apparatus, and a target air pressure. The apparatus also has a display panel for displaying the determined air pressure and at least one of the provided colors of light. In addition, the apparatus has a pressure sensor for determining the determined air pressure and a computer defining functions performed by the pressure gauge, wherein the computer causes the source of light to display the different colors of light in accordance with the numerical relationship between the determined air pressure and the target air pressure.

The present invention can also be viewed as providing a method for sensing and displaying air pressure via a pressure gauge. In this regard, one embodiment of such a method, among others, can be broadly summarized by the following steps: programming a target air pressure into a memory of the pressure gauge; determining an actual air pressure of an inflatable item; comparing the target air pressure with the actual air pressure; and changing a color of a display via a display panel based upon a result of the comparing step.

Other apparatus, methods, features, and advantages of the present invention will be or become apparent to one having ordinary skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components and positioning in the drawings are not necessarily to scale, emphasis instead being placed upon clearly illustrating the principles of the present invention. Moreover, in the drawings, like reference numerals designate corresponding parts throughout the several views.

FIG. 4 is a flowchart describing general operation of the programmable pressure gauge of FIG. 1.

DETAILED DESCRIPTION

The present invention is directed to a programmable pressure gauge that may be used to assist a person in accurately filling and checking air pressure in an inflatable item. For illustration purposes, the operation of the programmable pressure gauge is described herein as the gauge would be used to inflate an automobile tire. It should be noted, however, that other applications in which the programmable pressure gauge may be used will be known and/or appreciated by those having ordinary skill in the art.

Figure 1:
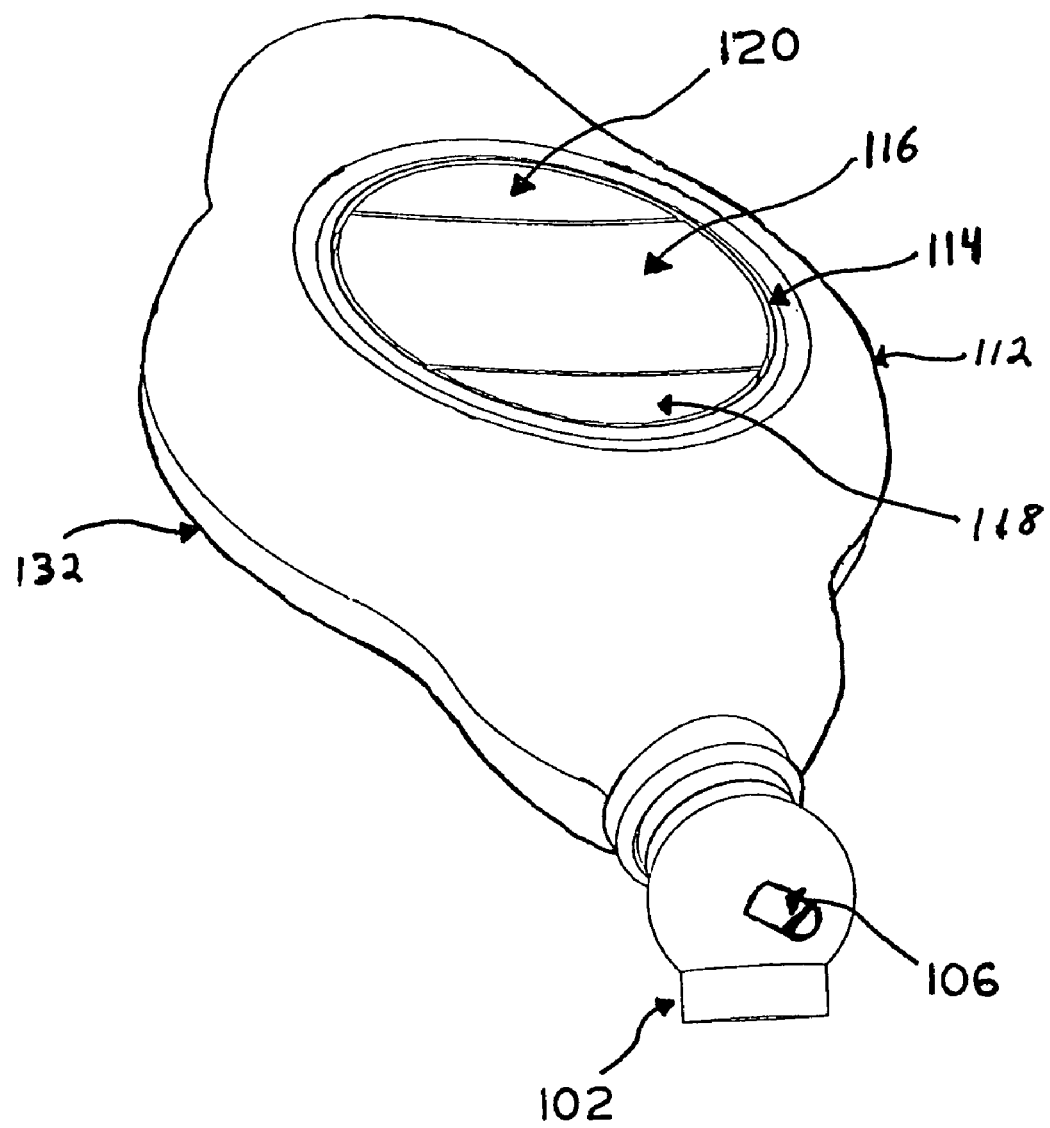
FIG. 1 is a top planar view illustrating external components of a programmable pressure gauge consistent with a first exemplary embodiment of the present invention.
Figure 2:
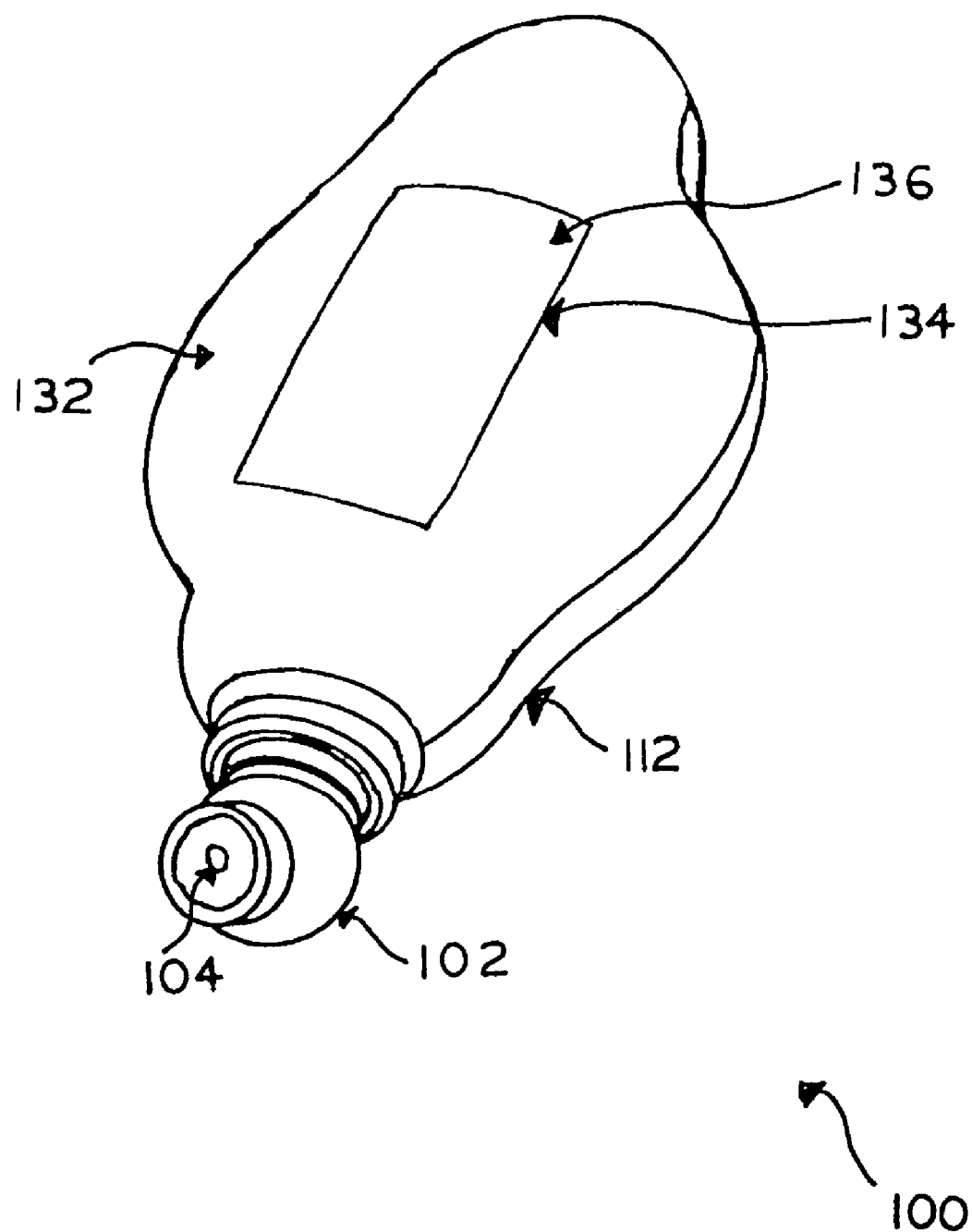
FIG. 2 is a bottom planar view illustrating the external components of the programmable pressure gauge of FIG. 1.

FIG. 1 and FIG. 2 are, respectively, top and bottom planar views of external components of a programmable pressure gauge 100, consistent with a first exemplary embodiment of the present invention. As is shown by FIG. 1 and FIG. 2, the programmable pressure gauge 100 contains a top housing component 112 and a bottom housing component 132.

The top and bottom housing components 112, 132 may be connected using any means known in the art, including, but not limited to, a screw means, a friction fit, a glue means and/or an interference fit. In addition, the programmable tire gauge 100 may alternatively be fabricated as one solid structure having a top portion and a bottom portion.

The programmable pressure gauge 100 also contains a first valve 102 that is capable of cooperating with a valve stem located on an automobile tire, for allowing the programmable pressure gauge 100 to determine air pressure within the automobile tire. The first valve 102 may contain a centrally located stem 104 that is capable of pressing into a pin located within a typical automobile tire valve stem, thereby opening a channel for air transmission from the automobile tire to the programmable tire gauge 100. In addition, the first valve 102 may contain an external stem 106 that may be utilized to remove air from an automobile tire by pressing the external stem 106 into the pin of the automobile tire valve stem.

In accordance with an alternative embodiment of the invention, air may be removed from the automobile tire by not entirely pressing the first valve 102 into the automobile tire valve stem. Specifically, while the centrally located stem 104 of the first valve 102 may press into the pin of the automobile tire valve stem, thereby allowing air to flow out of the automobile tire, if an air tight connection is not provided between the first valve 102 and the automobile tire valve stem, air will leak out of the automobile tire. It should be noted, however, that if the first valve 102 is instead entirely pressed into the automobile tire valve stem, or the automobile tire valve stem is pressed into the first valve 102, air is transmitted directly to the programmable pressure gauge 100 and does not leak out of the automobile tire, although a minimal amount of air may leak out of the automobile tire, and not into the first valve 102, before and/or after the first valve 102 is entirely pressed into the automobile tire valve stem.

The top housing component 112 includes an opening portion 114 capable of receiving a viewing panel 116, a first button 118, and a second button 120, where each of the buttons 118, 120 may be manually pressed. In accordance with the first exemplary embodiment of the invention, the viewing panel 116 may be, for example, but not limited to, a liquid crystal display (LCD) panel 116 that is capable of allowing a numerical display to be viewed therethrough, and allowing different colors to be viewed therethrough (explained below). Significance of these different colors is explained in detail below. It should be noted that the programmable pressure gauge 100 may instead have one button that is capable of performing functionality described herein. Alternatively, more than two buttons may be located on the programmable pressure gauge 100.

In addition to the above mentioned, in accordance with alternative embodiments of the invention, the viewing panel 116, the first button 118, and the second button 120 may be located in different areas of the programmable pressure gauge 100. As an example, the viewing panel 116 may be located on the top housing component 132, while the first button 118 and the second button 120 may be located on the bottom housing component 132 or between the top housing component 112 and the bottom housing component 132.

The bottom housing component 132 may contain an opening 134 for receiving a source of power, such as, but not limited to, a battery or multiple batteries. It should be noted that the opening 134 is not required if the source of power utilized by the programmable pressure gauge 100 is an external power source, such as a power outlet. If an external power source is utilized, a power cord may be attached to the programmable pressure gauge 100. In addition, it should be noted that the source of power may instead be located within the top housing component 112 and the bottom housing component 132 prior to assembly of the programmable pressure gauge 100, thereby alleviating the need for the opening 134.

Returning to the first exemplary embodiment of the invention, the programmable pressure gauge 100 contains a cover 136 that fits over the opening 134, thereby securing the battery, or batteries, within the opening 134. The cover 136 may be attached to the bottom housing component 132 via use of a screw means, a friction, an interference fit, or any other securing mechanism.

Figure 3:
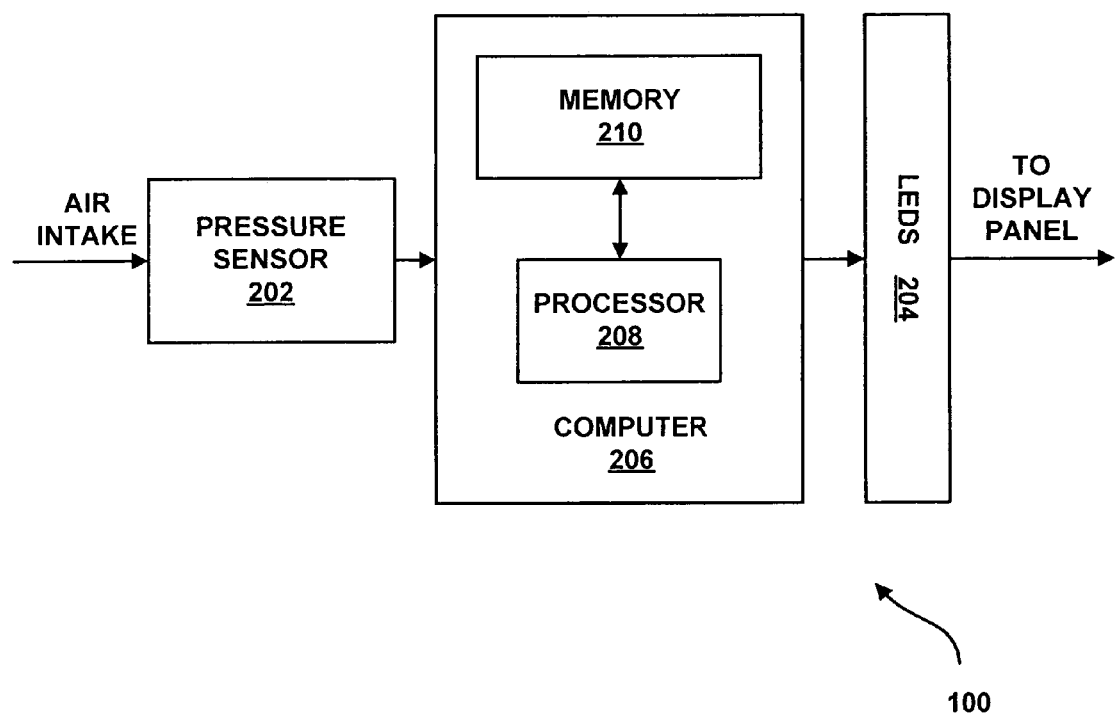
FIG. 3 is a block diagram illustrating internal portions of the programmable pressure gauge of FIG. 1.

FIG. 3 is a block diagram illustrating internal components of the programmable pressure gauge 100, in accordance with the first exemplary embodiment of the invention. It should be noted that the following is merely an example of internal components of the programmable pressure gauge 100. Alternatively, different components may be utilized to perform the functions described herein.

As is shown by FIG. 3, the programmable pressure gauge 100 contains a pressure sensor 202, a series of light emitting diodes (LEDs) 204, and a computer 206, where the computer 206 is used for defining functions performed by the programmable pressure gauge 100. It should be noted that the programmable pressure gauge 100 can be implemented in software (e.g., firmware), hardware, or a combination thereof. Specifically, functionality performed by the programmable pressure gauge 100, as described herein, may be performed with software (i.e., an executable program) stored within a memory 210 of the computer 206, or with any or a combination of the following hardware technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The computer 206 includes a processor 208 and the memory 210, which are communicatively coupled via a local interface (not shown). The local interface can be, for example, but not limited to, one or more buses or other wired or wireless connections, as is known in the art. The local interface may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 208 is a hardware device that executes functions defined by the memory 210, as described below. The processor 208 can be any custom made or commercially available processor, a central processing unit (CPU), an auxiliary processor among several processors associated with the computer 206, a semiconductor based microprocessor (in the form of a microchip or chip set), a macroprocessor, or generally any device for executing instructions.

The memory 210 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 210 may incorporate electronic, magnetic, optical, and/or other types of storage media. Note that the memory 210 can have a distributed architecture, where various components are situated remote from one another, but can be accessed by the processor 208. Functionality performed by the programmable pressure gauge 100 is defined within the memory 210, although it should be noted that if hardware technologies are utilized instead, the memory 210 need not define such functionality.

The programmable pressure gauge 100 may also contain a separate storage device (not shown) therein, such as, for example, a second volatile or nonvolatile memory element. The separate storage device may be used for storing predefined target pressures, as specified by a user of the programmable pressure gauge 100. Further description of specifying and storing target pressures is provided below.

The series of LEDs 204 are preferably capable of displaying different colors through the display panel 116 (FIG. 1). In accordance with the first exemplary embodiment of the invention, the series of LEDs 204 contains a first LED, a second LED, and a third LED, where the first LED is a red LED, the second LED is a blue LED, and the third LED is a green LED. Each of the LEDs is capable of changing color displayed via the display panel 116 (FIG. 1) as defined by the memory 210, and as is described in detail below.

It should be noted that the series of LEDs 204 may be replaced with a different source of light, where the source of light is capable of displaying different colors of light. In addition, while the first exemplary embodiment of the invention provides three different colors, more, or fewer colors may be provided. Also, the series of LEDs 204 may be replaced by a single source of light capable of displaying different colors of light.

The pressure sensor 202 is capable of detecting changes in air pressure and measuring actual air pressure. Measured air pressure readings are transmitted from the pressure sensor 202 to the computer 206 for storing, analysis, or comparison, as is explained in detail below. As an example, the pressure sensor 202 may measure air pressure and transmit a signal representing the measured air pressure to the computer 206.

FIG. 4 is a flowchart describing general operation of the programmable pressure gauge 100 of FIG. 1, in accordance with the first exemplary embodiment of the invention. It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

As is shown by block 300, the programmable pressure gauge 100 (FIG. 1) is turned on. To turn on the programmable pressure gauge 100 (FIG. 1), either the first button 118 (FIG. 1) or the second button 120 (FIG. 1) is pressed. It should be noted that the first button 118 (FIG. 1) may be shaped as an up arrow, while the second button 120 (FIG. 1) may be shaped as a down arrow. The shapes of the first and second buttons 118, 120 (FIG. 1) is beneficial in specifying whether pressing the respective button will increase, or decrease a specified pressure, as is explained in detail below. Of course, the first and second buttons 118, 120 (FIG. 1) may have any shape. In addition, as mentioned above, there may be one button instead of two, or more than two buttons.

In accordance with an alternative embodiment of the invention, the programmable pressure gauge 100 (FIG. 1) may also be turned on when the pressure sensor 202 (FIG. 3) senses an increase in an amount of air pressure. As an example, if the first valve 102 (FIG. 1) is attached to the valve stem of an automobile tire, the pressure sensor 202 (FIG. 3) will sense an increase in an amount of air pressure, thereby resulting in the programmable pressure gauge 100 (FIG. 1) turning on.

In accordance with the first exemplary embodiment of the invention, when turned on, the programmable pressure gauge 100 (FIG. 1) automatically displays a predefined target pressure. Specifically, the computer 206 (FIG. 3) may instruct a driver (not shown) of the display panel 116 (FIG. 1) to display the predefined target pressure. It should be noted that in accordance with alternative embodiments of the invention, the programmable pressure gauge 100 (FIG. 1) may not automatically display a predefined target pressure. Instead, the programmable pressure gauge 100 (FIG. 1) may require user interaction with the gauge 100 (FIG. 1) after starting, prior to displaying a predefined target pressure, or the gauge 100 (FIG. 1) may not have a target pressure when turned on.

Returning to the description of the first exemplary embodiment of the invention, as is shown by block 302, the user may then either manually set a desired pressure (i.e., pounds per square inch (PSI)) to be stored as a target pressure, or use the programmable pressure gauge 100 (FIG. 1) without setting a desired pressure, in which case a predefined target pressure that has been previously stored is used. In accordance with the first exemplary embodiment of the invention, the programmable pressure gauge 100 (FIG. 1) may have two target pressures. As an example, the programmable pressure gauge 100 (FIG. 1) may store a first target pressure and a second tire pressure, where the first target pressure is a desired pressure for a set of tires on a first automobile, while the second target pressure is a desired pressure for a set of tires on a second automobile. Of course, additional target pressures may also be stored within the programmable pressure gauge 100 (FIG. 1).

If the user elects to manually select a desired pressure to be set as a target pressure, the user may set the target pressure via viewing the display panel 116 (FIG. 1) and using the first and second buttons 118, 120 (FIG. 1) (block 304). The user first presses either the first button 118 (FIG. 1) or the second button 120 (FIG. 1), thereby selecting to set either the first target pressure or the second target pressure, respectively.

To set the first target pressure, the user may hold down the first button 118 (FIG. 1) for more than a predefined period, for example, but not limited to, three (3) seconds. After holding the first button 118 (FIG. 1) for the predefined period, the display panel 116 (FIG. 1) indicates that the programmable pressure gauge 100 (FIG. 1) is in a "set pressure" mode. The programmable pressure gauge 100 (FIG. 1) may indicate that it is in the "set pressure" mode by having a displayed first target pressure blink on and off via the display panel 116 (FIG. 1). Alternatively, other methods may be used to indicate that the programmable pressure gauge 100 (FIG. 1) is in the "set pressure" mode, or the programmable pressure gauge 100 (FIG. 1) may not indicate that it is in the "set pressure" mode.

When the programmable pressure gauge 100 (FIG. 1) is in the "set pressure" mode the user may press either the first button 118 (FIG. 1) or the second button 120 (FIG. 1) to select the desired first target pressure. Preferably, pressing the first button 118 (FIG. 1) increases the displayed desired first pressure in predefined increments, preferably by one (1) PSI. Alternatively, the pressure displayed on the display panel 116 (FIG. 1) may increase in increments of two (2), five (5), or any other increment. In addition, pressing the second button 120 (FIG. 1) decreases the displayed desired first pressure in predefined increments.

To set the desired first pressure as the first target pressure the user releases either the first button 118 (FIG. 1) or the second button 120 (FIG. 1) for a predefined period, for example, but not limited to, three (3) seconds. After the first button 118 (FIG. 1) or second button 120 (FIG. 1) has been released for the predefined period, the pressure displayed on the display panel 116 (FIG. 1) is stored as the first target pressure within either the memory 210 (FIG. 3) or within the storage device (not shown).

To set the second target pressure, the user may hold down the second button 120 (FIG. 1) for more than a predefined period, for example, but not limited to, three (3) seconds. After holding the second button 120 (FIG. 1) for the predefined period, the display panel 116 (FIG. 1) indicates that the programmable pressure gauge 100 (FIG. 1) is in the "set pressure" mode. The programmable pressure gauge 100 (FIG. 1) may indicate that it is in the "set pressure" mode by having a displayed second target pressure blink on and off via the display panel 116 (FIG. 1). Alternatively, other methods may be used to indicate that the programmable pressure gauge 100 (FIG. 1) is in the "set pressure" mode, or the programmable pressure gauge 100 (FIG. 1) may not indicate that it is in the "set pressure" mode.

When the programmable pressure gauge 100 (FIG. 1) is in the "set pressure" mode, the user may press either the first button 118 (FIG. 1) or the second button 120 (FIG. 1) to select the desired second target pressure. Preferably, pressing the first button 118 (FIG. 1) increases the displayed desired second pressure in predefined increments, preferably by one (1) PSI. Alternatively, the pressure displayed on the display panel 116 (FIG. 1) may increase in increments of two (2), five (5), or any other increment. In addition, pressing the second button 120 (FIG. 1) decreases the displayed desired second pressure in predefined increments.

To set the desired second pressure as the second target pressure the user releases either the first button 118 (FIG. 1) or the second button 120 (FIG. 1) for a predefined period, for example, but not limited to, three (3) seconds. After the first button 118 (FIG. 1) or second button 120 (FIG. 1) has been released for the predefined period, the pressure displayed on the display panel 116 (FIG. 1) is stored as the second target pressure within either the memory 210 (FIG. 3) or within the storage device (not shown).

Whether the user uses the programmable pressure gauge 100 (FIG. 1) without setting a desired pressure as a target pressure, or after the user sets the target pressure, as described above, the user then connects the first valve 102 (FIG. 1) of the programmable pressure gauge 100 (FIG. 1) to the valve stem of the automobile tire (block 306). The pressure sensor 202 (FIG. 3) then determines the pressure in the automobile tire (block 308) via methods known by those having ordinary skill in the art. As is shown by block 310, the pressure sensor 202 (FIG. 3) transmits the determined pressure to the computer 206 (FIG. 3) where the determined pressure is compared to the target pressure. In addition, the determined pressure is displayed on the display panel 116 (FIG. 1) (block 312).

In accordance with the first exemplary embodiment of the invention, the computer 206 (FIG. 3) causes specific LEDs within the series of LEDs 204 (FIG. 3) to glow, thereby causing the display panel 116 (FIG. 1) to change color in accordance with differentiation between the determined pressure and the target pressure (block 314). Specifically, if the determined pressure is higher than the target pressure by a predefined amount, the first LED is turned on, thereby causing the display panel 116 (FIG. 1) to glow red. As an example, if the target pressure is 30 PSI, and the predefined amount is 3 PSI, a determined pressure of 33 PSI or higher results in the first LED turning on and the display panel 116 (FIG. 1) glowing red. It should be noted that the predefined range for the first LED may be larger or smaller.

If, instead, the determined pressure is at the target pressure or within a range of the target pressure, the second LED is turned on, thereby causing the display panel 116 (FIG. 1) to glow blue. It should be noted that there may not be a range for the target pressure, in which case the second LED will turn on when the determined pressure is at the target pressure, and not when the determined pressure is not at the target pressure.

In addition, if the determined pressure is lower that the target pressure by a predefined amount, the third LED is turned on, thereby causing the display panel 116 (FIG. 1) to glow green. It should be noted that the predefined amount for the third LED may be larger or smaller.

Use of the above mentioned display panel color scheme provides the user with a visual means of indicating when the automobile tire requires additional air, or requires the removal of air. It should be noted that in accordance with the first exemplary embodiment of the invention, both the target pressure stored in either the memory 210 (FIG. 3) or the separate storage device (not shown), and the determined pressures are displayed on the display panel 116 (FIG. 1). Communication between the computer 206 (FIG. 3) and the series of LEDs 204 (FIG. 3) may be provided by an LED controller or by any other means known to one having ordinary skill in the art.

In accordance with the first exemplary embodiment of the invention, the programmable pressure gauge 100 (FIG. 1), via the computer 206 (FIG. 3), is also capable of automatically turning off if the computer 206 (FIG. 3) detects that the first button 118 (FIG. 1) and the second button 120 (FIG. 1) have not been pressed for a predetermined period of time, such as, for example, one minute, and the pressure sensor 202 (FIG. 3) has not detected an air pressure for the predetermined period of time.

It should be emphasized that the above-described embodiments of the present invention are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. A pressure gauge, comprising:
    a source of light capable of providing more than one color of light, where each color of light within said more than one color of light corresponds to a numerical relationship between a determined air pressure of an inflatable item, determined by said pressure gauge, and a target air pressure; and
    a display panel for displaying said determined pressure and at least one of said provided colors of light;
    wherein the source of light is capable of providing three or more of the colors of light, where each of the three or more colors of light corresponds to a different numerical relationship between the determined air pressure of the inflatable item and the target air pressure.

2. The pressure gauge of claim 1, further comprising:
    a pressure sensor for determining said determined air pressure; and
    a computer defining functions performed by said pressure gauge, wherein said computer causes said source of light to display said different colors of light in accordance with said numerical relationship between said determined air pressure and said target air pressure.

3. The pressure gauge of claim 2, wherein said computer further comprises a memory that stores said defined functions, and a processor for causing said defined functions to be performed by said pressure gauge.

4. The pressure gauge of claim 2, wherein:
    said source of light displays a first color of light if said determined air pressure is higher than a first predefined amount above said target air pressure;
    said source of light displays a second color flight if said determined pressure is within a predefined range of said target pressure; and
    said source of light displays a third color of light if said determined pressure is below said target pressure by a second predefined amount.

5. The pressure gauge of claim 4, wherein said predefined range is zero.

6. The pressure gauge of claim 4, wherein said source of light is a series of light emitting diodes.

7. The pressure gauge of claim 3, further comprising:
a valve for attaching the pressure gauge to an inflatable item; and
a user interface mechanism for programming said target pressure into said computer.

8. The pressure gauge of claim 7, wherein said user interface mechanism is at least one button.

9. The pressure gauge of claim 7, wherein more than one pressure is stored within said pressure gauge as a target air pressure.

10. The pressure gauge of claim 7, wherein said user interface further comprises a first button and a second button, and wherein said programming of said target air pressure comprises the steps of:
pressing said first button or said second button for a predefined period of time resulting in said pressure gauge entering a "set pressure" mode;
pressing said first button or said second button to increase or decrease said target air pressure as displayed on said display panel; and
releasing said first button or said second button for a predefined period of time, resulting in said displayed air pressure being stored as said target air pressure.

11. The pressure gauge of claim 2, further comprising a mechanism for bleeding air from said inflatable item.

12. The pressure gauge of claim 2, wherein said display panel displays both said determined air pressure and said target air pressure.

13. A method for sensing and displaying air pressure via a pressure gauge, comprising the steps of:
programming a target air pressure into a memory of said pressure gauge;
determining an actual air pressure of an inflatable item;
comparing said target air pressure with said actual air pressure; and
changing a color of a display via a display panel based upon a result of said comparing step;
wherein the changing the color of the display further comprises changing a color of a display via a display panel to one of at least three or more colors of light based upon the result of the comparing step.

14. The method of claim 13, further comprising the step of displaying said actual air pressure on said display.

15. The method of claim 13, wherein said step of programming a target air pressure into said memory further comprises the steps of:
pressing a first button or a second button of said pressure gauge for a predefined period of time resulting in said pressure gauge entering a "set pressure" mode;
pressing said first button or said second button to increase or decrease said target air pressure as displayed on said display panel; and
releasing said first button or said second button for a predefined period of time, resulting is a displayed air pressure being stored as said target air pressure.

16. The method of claim 13, wherein said step of changing a color of said display panel further comprises the steps of:
displaying a first color of light if said actual air pressure is higher than a first predefined amount above said target air pressure;
displaying a second color of light if said actual air pressure is within a predefined range of said target air pressure; and
displaying a third color of light if said actual air pressure is below said target air pressure by a second predefined amount.

17. The method of claim 16, wherein said predefined range is zero.

18. The method of claim 13, wherein more than one target air pressure is programmed into said memory.

19. A pressure gauge, comprising:
means for providing more than one color of light, where each color of light corresponds to a numerical relationship between a determined air pressure of an inflatable item, determined by said pressure gauge, and a target air pressure;
means for displaying said determined air pressure and at least one of said provided colors of light;
means for determining said determined air pressure; and
means for defining functions performed by said pressure gauge, wherein said means for defining functions causes said means for providing more than one color of light to display said different colors of light in accordance with said numerical relationship between said determined air pressure and said target air pressure;
wherein the means for providing more than one color of light further comprises means for providing three or more of the colors of light, where each of the three or more colors of light corresponds to a different numerical relationship between the determined air pressure of the inflatable item and the target air pressure.

20. The pressure gauge of claim 19, wherein said means for defining functions further comprises means for storing said defined functions, and means for causing said defined functions to be performed by said pressure gauge.

21. The pressure gauge of claim 20, wherein:
said means for providing more than one color of light displays a first color of light if said determined air pressure is higher than a first predefined amount above said target air pressure;
said means for providing more than one color of light displays a second color of light if said determined air pressure is within a predefined range of said target air pressure; and
said means for providing more than one color of light displays a third color of light if said determined air pressure is below said target air pressure by a second predefined amount.

22. The pressure gauge of claim 21, wherein said predefined range is zero.

23. The pressure gauge of claim 19, further comprising:
means for attaching the pressure gauge to an inflatable item; and
means for programming said target air pressure into said means for defining functions performed by said pressure gauge.

24. The pressure gauge of claim 19, wherein more than one target air pressure is stored within said pressure gauge.

25. The pressure gauge of claim 19, further comprising means for removing air from said inflatable item.

26. The pressure gauge of claim 19, wherein said means for displaying said, determined air pressure displays both said determined air pressure and said target air pressure.

* * * * *